United States Patent [19]

Schweikert

[11] Patent Number: 5,035,262

[45] Date of Patent: Jul. 30, 1991

[54] DEVICE FOR MIXING LIQUIDS

[76] Inventor: Walter Schweikert, Postfach 13 09, 7310 Plochingen, Fed. Rep. of Germany

[21] Appl. No.: 449,822

[22] PCT Filed: May 5, 1988

[86] PCT No.: PCT/DE88/00263

§ 371 Date: Dec. 7, 1989

§ 102(e) Date: Dec. 7, 1989

[87] PCT Pub. No.: WO88/08745

PCT Pub. Date: Nov. 17, 1988

[30] Foreign Application Priority Data

May 9, 1987 [DE] Fed. Rep. of Germany ....... 3715563

[51] Int. Cl.$^5$ .............................................. F16K 11/22
[52] U.S. Cl. ..................................... 137/607; 137/637
[58] Field of Search .................. 137/607, 597, 637

[56] References Cited

U.S. PATENT DOCUMENTS

| 176,774 | 5/1876 | Cory | 137/595 X |
| 363,884 | 5/1887 | Behnke | 137/595 |
| 1,641,561 | 9/1927 | Whidden | 137/607 |
| 3,332,440 | 7/1967 | Brakebill | 137/595 |
| 3,847,210 | 11/1974 | Wells | 137/595 X |
| 4,266,573 | 5/1981 | Braatz | 137/607 X |
| 4,467,834 | 8/1984 | Rochat et al. | 137/607 X |
| 4,546,794 | 10/1985 | Ball | 137/607 X |
| 4,753,265 | 6/1988 | Barrett et al. | 137/597 |

FOREIGN PATENT DOCUMENTS 572530  1/1958  Italy ................................ 137/607

Primary Examiner—Stephen M. Hepperle
Attorney, Agent, or Firm—Edwin E. Greigg; Ronald E. Greigg

[57] ABSTRACT

An apparatus for mixing liquids in a housing including a plurality of valves which are adjustable by use of drive gears on the outside of the housing. At least one of the drive gears may have some teeth missing so that one valve may be adjusted without adjusting the other valve.

12 Claims, 3 Drawing Sheets

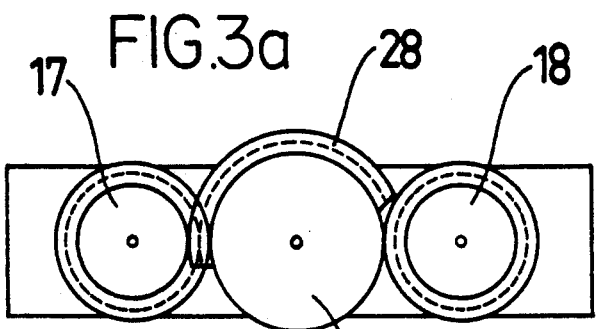
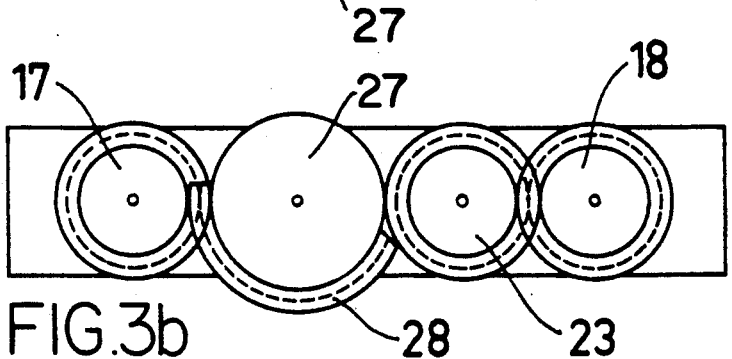
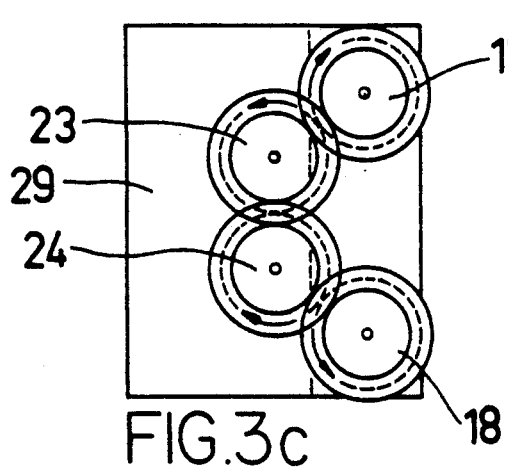
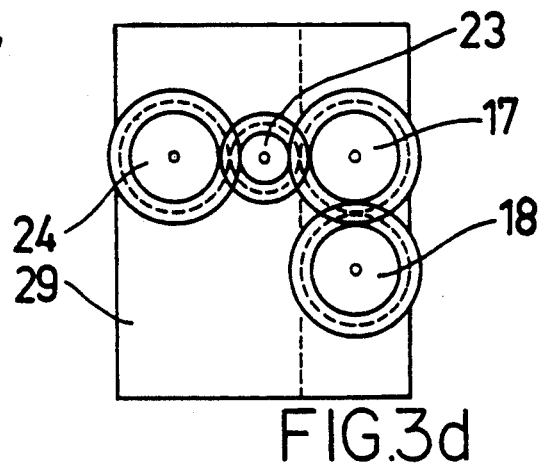
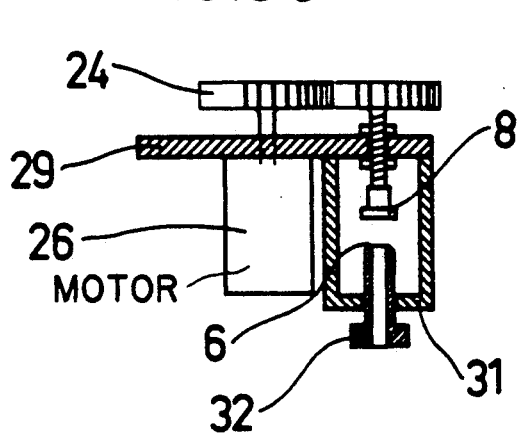
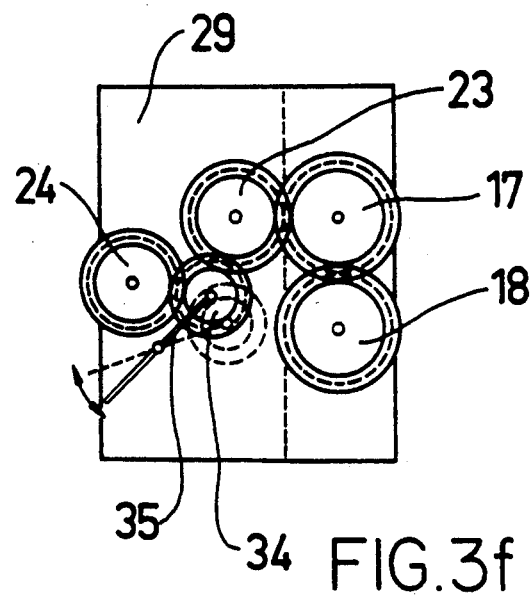

DEVICE FOR MIXING LIQUIDS

BACKGROUND OF THE INVENTION

The invention is based on a device for mixing liquids by adjusting a mixing liquid mixing faucet, as generically defined hereinafter.

Mixing faucets for mixing liquids are known in many forms, as are methods for adjusting the movable valve members, of such mixing faucets; the mixing of liquids takes place when via at least two inflow lines of the mixing faucet, liquids that differ in temperature or type are supplied, and these liquids are then mixed within the faucet and supplied to the user in the form of a liquid mixture via at least one outflow line.

The quantity of a given liquid supplied to the mixture depends on the one hand on the control cross sections via which the particular liquid is delivered to the mixing faucet, and on the quantity drawn by the user, and on the other hand on the pressures of the inflowing liquids and the backup pressure on the consumer side.

The invention does not relate to mixing valve sets in which a constant pressure or flow rate is maintained by differently controlled cross sections (U.S. Pat. No. 3,038,496), nor to mixing faucets that operate only with a spool valve or the like, but rather pertains solely to mixing faucets in which via the movable valve members, the liquid streams supplied are determined independently of one another by means of the flow cross sections controlled by the movable valve members (International reference WO, A 82/02101). Typically these are valves in which the movable valve member is actuated via a screw-like mechanism (worm) via a valve shaft from outside the valve. A typical mixing faucet is for example the inflow set for a bathtub, in which cold and hot water are mixed together by varying the respective inflow cross sections and then flow out into the tub virtually without resistance.

However, mixing faucets also exist in which two movable valve members are disposed on one shaft, so that upon displacement of the shaft, which may for instance once again be effected via a worm and by rotation from outside the valve, one inflow cross section is narrowed while the other is enlarged in the same proportion. Unlike the bathtub faucet, in this case the association of the characteristic curves of the two valves is fixed and is not variable. A disadvantage, then, however, is that the flow quantity is likewise fixed; that is, the total cross section of the two inflows is divided between the two inflow cross sections depending on the location of the adjusting shaft, so that the range of usage is greatly restricted; for instance, it can be used only as a mixing valve in heating systems, or as a pressure-operated valve in a domestic or industrial hot-water system.

ADVANTAGES OF THE INVENTION

The mixing faucet according to the invention having the defining characteristics set forth herein has an advantage over the prior art that the movable valve members are adjustable independently on one another and nevertheless synchronously, so that virtually any desired mixing characteristic curve can be attained, while at the same time varying the outflow quantity. The characteristic curve depends on the type of coupling, and the flow cross sections can be varied in opposite directions or in the same direction in the adjustment. For instance, when the cross section of the first valve is varied, it is attainable via the coupling that the change in cross section of the second valve is effected in the same direction, but to a different magnitude. While the first valve for instance effects a 2 mm stroke of the movable valve member per revolution, it is attainable via the coupling that the second valve undergoes only one-half revolution, or in other words only 1 mm stroke of its movable valve members. It is naturally also conceivable that the worm of the second valve have a different thread pitch, so that in the second valve, again upon one complete revolution, either a longer or shorter stroke, as desired, of the movable valve member is traversed than for the first valve. The particular advantage of the independently movable valve members is also based on the fact that the gear system by way of which the movable valve member is actuated for its stroke is replaceable. Not least, it is also conceivable for the two movable valve members to be actuated independently of one another, each via a control motor, and that the two control motors be coupled together, so that in this way as well, virtually any desired characteristic curve is attainable. As the coupling, a rod linkage, belt drive, a combination of the two, or some other means can be used. As valves, a valve block can be used in which a plurality of valve members operate, or a plurality of valve fixtures available in commerce can be combined together to make the invention. According to the invention, the coupling may be designed such that it is put out of action so that the valves can be manually actuatable once again. This may for instance happen by putting transmission means such as gear wheels out of engagement, which is done via levers or tooth gaps within the gear wheel plane, or by pulling out gear teeth vertically to this plane.

In an advantageous embodiment of the invention, the cross sectional change of the valves during the adjustment is in the same direction, so that a change in cross section of the first valve effects a change in cross section of the second valve that is greater or smaller per degree of adjustment than for the first valve. Thus for one valve the change in cross section is in advance of the other, or vice versa.

During the adjustment, the change in cross section of the valves may thus be contrary, so that an increase in cross section of the first valve effects a decrease in cross section of the second valve. As a result, a change in the flow cross sections can be attained very rapidly, with only relatively little adjustment. According to the invention, the coupling can also vary the adjusting proportion between the free valve cross sections.

In a further embodiment of the invention relating to the mixing faucet, the change in cross section is effected by rotating the two valve members, for instance via worms or threads on the valve shafts, and the coupling is effected with means located outside the valve block and transmitting the rotational motion. These means may be of various kinds, for example a kinematic lever system, or also gear wheels the teeth of which mesh and which can be secured directly to the shafts of the valve members, or pulleys can be used that are drivable via drive belts. When gear wheels are used, a rotation in the same direction can be attained by using intermediate wheels. Contrarily, if with two valves located side by side the gear wheels mesh directly, then the direction of rotation of the valve shaft is contrary, so that with the same course of the worm thread a contrary adjustment of the movable valve members takes place. A substantial advantage is that mass-produced valves can be screwed together directly with their outflow connections, so that when the shafts are placed parallel the gear wheels can mesh together in a simple manner.

According to an advantageous embodiment of the invention, tooth gaps can be provided on a driving gear wheel or on an intermediate gear wheel. As a result, the drive of one valve member, for instance, is temporarily interrupted, while another valve member continues to be adjusted. For this purpose, the drive wheel preferably has a substantially larger diameter than the drive gear wheels, because usually only one gap appears per revolution of the drive wheel, in order in this way to assure an otherwise continuous control.

Naturally more than two valves may also be used in accordance with the invention, which are then combined into a block and in which the drive preferably takes place beginning at one valve, which is for instance actuated by a control motor. Instead of a flat seat valve, it is naturally possible to use conical valves or those having a slide; the definitive factor is that the movable valve member determining the flow cross section, upon rotation of the valve shaft, determines a corresponding nominal control cross section. The intermediate wheel can then for instance be removed, to enable manual adjustment. Besides applications involving mixing cold and hot water, mixtures where colored liquids, or liquids at a third temperature, such as ice water, are mixed together may be sought.

In a further feature of the invention, with the valve usually embodied as a seat valve, the movable valve member or the valve seat may have a resilient sealing element, so that beginning at the closed state, one valve has already opened while the other valve still remains closed because of the resiliency of the sealing element and then, only after a predetermined cross section has been traversed, releases the other liquid stream, and vice versa. Instead of a resilient sealing element, this terminal position can also be made possible by a slip coupling between the drive gear wheel and the rotary shaft of the movable valve member.

Further advantages and advantageous features of the invention can be found in the ensuing description, drawing and claims.

DRAWING

An exemplary embodiment of the subject of the invention is shown in the drawing and described in further detail below. Shown are:

FIG. 1, a mixing faucet according to the invention, in a perspective view;

FIG. 2, a longitudinal section through the mixing faucet of FIG. 1; and

FIG. 3a, 3b, 3c, 3d, 3e, and 3f illustrate various kinds of gear mechanism according to the invention, shown schematically.

DESCRIPTION OF THE EXEMPLARY EMBODIMENT

Figure 1:
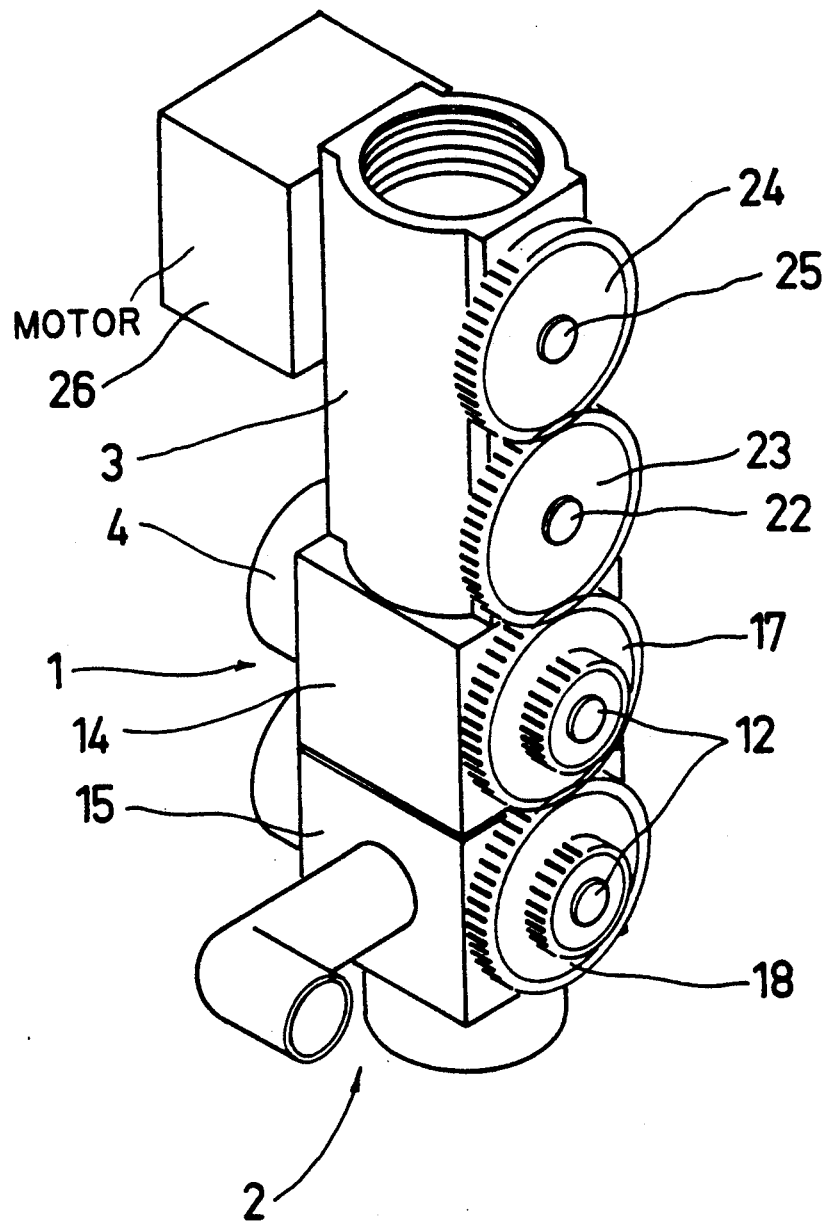
Figure 2:
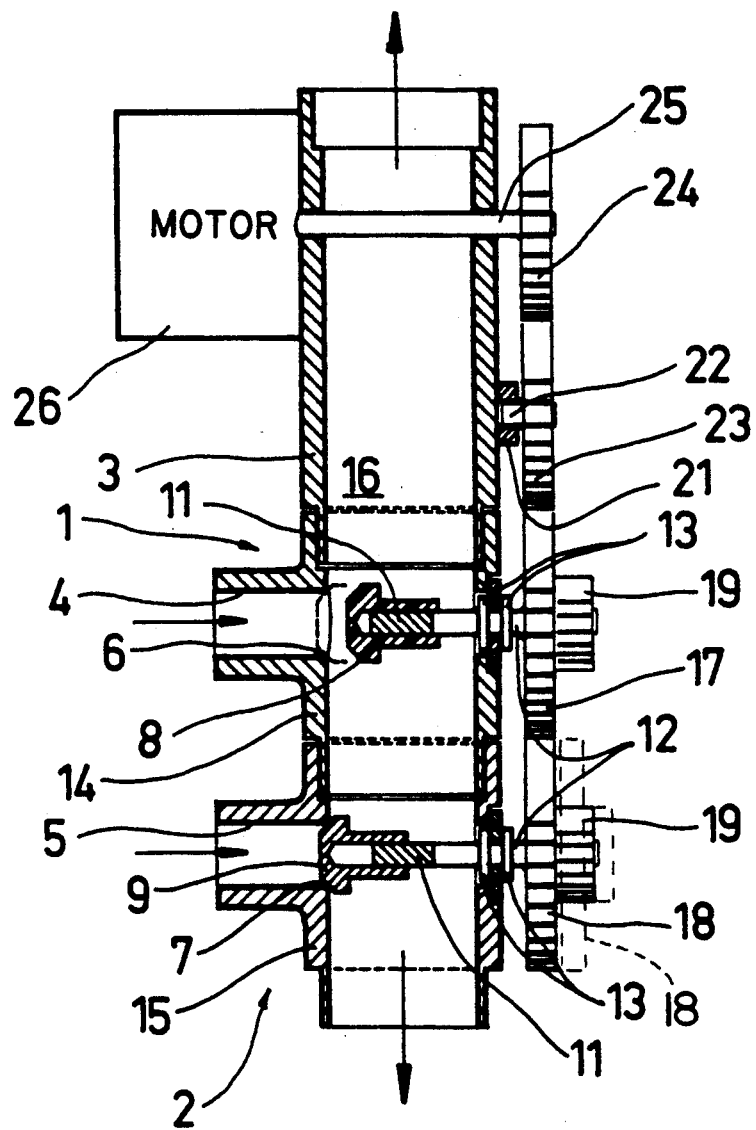

In the exemplary embodiment shown, two conventional seat valves 1 and 2 are screwed together with a pipe connection 3 to make a mixing faucet. The housings of the seat valves 1 and 2 each have one inflow connection 4 and 5 and one valve seat 6 and 7, which cooperate with a movable valve member 8 and 9, respectively. In each movable valve member there is a threaded bore 11, in which the valve shaft 12, which has a corresponding thread, moves. The valve shafts 12 have collars 13, which are supported on the respective valve housings 14 and 15, to prevent axial displacement of the valve shafts 12.

The valve housings 14 and 15 and the pipe connection 3 are screwed together such that a common mixing chamber 16 is created, from which the mixture can flow out, as indicated by the arrows.

One gear wheel 17 for the valve 1 and one gear wheel 18 for the valve 2 are disposed on the valve shafts 12, with their teeth meshing. Knobs 19 are present on the gear wheels 17 and 18, so that the valve shafts 12 can also be rotated by hand.

A loose guide 21 for the shaft 22 of an intermediate gear wheel 23 is disposed on the pipe connection 3. With its teeth, this intermediate gear wheel 23 meshes with the gear wheel 17, on the one hand, and a gear wheel 24, on the other, the shaft 25 of which is actuated by a control motor 26. The intermediate gear wheel 23 thus simultaneously serves as a coupling between the control motor and the gear wheels 17 and 18, so that when it is removed the valves can be actuated by hand. Depending on the flow cross sections determined by the movable valve members 8 and 9 in the valve seats 6 and 7, a corresponding quantity flows in the direction of the arrow via the inflow connections 4 and 5 into the mixing chamber 16, and from there can again flow out in the direction of the arrow. Depending on the type of thread, that is, left-hand or right-hand, a rotation of the gear wheel 17 and a corresponding rotation of the gear wheel 18 effects a common or contrary increase or decrease in the size of the inflow cross sections relative to one another. Naturally, instead of actuating the gear wheel 17 via the intermediate wheel 23, the gear wheel 24 can mesh directly with the gear wheel 17, or an intermediate wheel may be disposed between the gear wheels 17 and 18. The definitive factor for the invention is that the characteristic curve of the mixing faucet can be adapted to the demand by very simple means and in the manner of a building-block system.

In FIG. 3a–FIG. 3f various kinds of gear mechanisms are shown, in ways in which they can be used in the mixing faucet according to the invention. Once again, this is a small selection from among many actual possibilities. The first possibility shown, FIG. 3a, is three gear wheels, seen end-on, the two outer gear wheels 17 and 18 of which each actuate a movable valve member, while the middle gear wheel 27 has only a half-toothed ring 28. This gear wheel 27 is the drive wheel, while the gear wheels 17 and 18 are driven wheels. If the gear wheel 27 is now rotated, then only one of the two driven wheels 17 or 18 will be rotated at a time, while the other remains at a stop, because of the gap in the toothed ring. The dimensional ratios of the gear wheels 17, 18 to the gear wheel 27 are selected such that a sufficient rotation of the gear wheels 17, 18 takes place in order to attain the particular desired adjustment of the valve.

In the next diagram, FIG. 3b, four gear wheels are disposed in line, of which once again the gear wheel 27 has only a half-toothed ring 28. Between the gear wheel 27 and the toothed ring 28, an intermediate gear wheel 23 is provided, that merely idles and thus makes the rotational direction between the gear wheels 27 and 18 the same. Naturally the gears wheels may also be disposed in some other way; above all, however, these two versions show that even a gear wheel having a partially toothed ring is usable in corresponding fashion.

In the next three gear wheel combinations shown below, FIGS 3c, 3d, 3e, and 3f, the gear wheels are disposed on a mounting plate 29, which in turn is mounted on the valve housing 31. The illustration is merely schematic. In the valve housing, the valve seat 6 that cooperates with the movable valve member 8 is embodied via a screw nipple 32, as shown in cross-section in FIG. 3e. In this way, the height of the valve seat is adjustable in addition. The control motor 26 in this case is also mounted on the mounting plate 29 and actuates a drive gear wheel 24.

In the first gear mechanism of this group, FIG. 3e the drive wheel 24 on the one hand drives the driven wheel 18 of one valve directly and drives the driven wheel 17 of the second valve via an intermediate gear wheel 23. In this way it is assured that both driven wheels are adjusted in the same rotational direction.

For the mechanism shown on the right beside it, FIG. 3d, only the intermediate wheel 23 is driven by the drive wheel 24, and the intermediate wheel in turn actuates the driven wheel 17 of one valve, after which this driven wheel 17 rotates the driven wheel 18 of the second valve. Here the two driven wheels 17 and 18 rotate in opposite directions.

In the diagram shown below that of the mechanism, FIG. 3f what has just been described is in principle still true, except that a coupling gear wheel 34 can be introduced via a lever 35 between the drive wheel 24 and the intermediate gear wheel 23. That is, the intermediate gear wheel 23 is not rotated until the lever 35 pivots the coupling gear wheel 34 into the position shown.

All the characteristics in the description, in the ensuing claims, and shown in the drawing may be essential to the invention either individually or in any arbitrary combination with one another.

I claim:

1. A mixing faucet for mixing liquids, having a housing, a valve block with at least first and second valve members each of which include a flow cross section that includes a valve seat, each of said valve members may be movable independently of each other by use of separate valve shafts, each valve member controls one flow cross section, wherein a change in flow cross section is effected by rotation of the valve shafts of the movable valve members via a drive means, said drive means having drive gear wheels disposed outside the valve housing and aligned in a plane that mesh with one another and are secured to the shafts of the movable valve members and serving as a coupling between the valve members, which upon adjustment of said first valve member effects a simultaneous adjustment of said second valve member, wherein on the basis of a gear ratio of the coupling, a cross-sectional change at said second valve member differs from the cross-sectional change made at the first valve member, and at least one of said drive gear wheels secured to the valve shafts (12) is provided with tooth gaps that effect a disengagement of the drive gear wheels secured to the valve shafts in order to effect a temporary rotational interruption at at least one of the gear wheels.

2. A mixing faucet as defined by claim 1, in which said drive gear wheels secured to the valve shafts (12) can be disengaged by pulling them out of the plane of the drive gear wheels.

3. A mixing faucet as defined by claim 2, in which said drive gear wheels of one diameter ratio can be replaced as a set by other sets having other diameter ratios.

4. A mixing faucet as defined by claim 2, in which at least one control motor is provided to drive at least one of the valve members or drive gear wheels for at least one valve member.

5. A mixing faucet as defined by claim 1, in which said drive gear wheels of one diameter ratio can be replaced as a set by other sets having other diameter ratios.

6. A mixing faucet as defined by claim 1, in which at least one control motor is provided to drive at least one of the valve members or drive gear wheels for at least one valve member.

7. A mixing faucet for mixing liquids, having a housing, a valve block with at least first and second movable valve members each of which include a flow cross section that includes a valve seat, each of said valve members may be movable independently of each other by use of separate valve shafts, each valve member controls one flow cross section, wherein a change in flow cross section is effected by rotation of the valve shafts of the movable valve members via a drive means, said drive means having drive gear wheels disposed outside the valve housing and which mesh with one another and are secured to the shafts of the movable valve members and serving as a coupling between the valve members, which upon adjustment of said first valve member effects a simultaneous adjustment of said second valve member, wherein on the basis of a gear ratio of the coupling, a cross-sectional change at said second valve member differs from the cross-sectional change made at the first valve member, at least one of said movable valve members has resilient seating element or a resilient seat, so that from a closed state, an associated inflow line is not opened until after a stroke corresponding to a resiliency of said resilient sealing element or said resilient seat, and the valve opening can be blocked in a closing direction even though the movable valve member associated therewith is moved onward in the closing direction, and at least one of said drive gear wheels is provided with tooth gaps that effect a disengagement of the drive gear wheels secured to the valve shafts.

8. A mixing faucet as defined by claim 7, in which said drive gear wheels of one diameter ratio can be replaced as a set by other sets having other diameter ratios.

9. A mixing faucet as defined by claim 7, in which at least one control motor is provided to drive at least one of the valve members or drive gear wheels for at least one valve member.

10. A mixing faucet for mixing liquids, having a housing, a valve block with at least first and second movable valve members each of which include a flow cross section that includes a valve seat, each of said valve members may be movable independently of each other by use of separate valve shafts, each valve member controls one flow cross section, wherein a change in flow cross section is effected by rotation of the valve shafts of the movable valve members via a drive means, said drive means having drive gear wheels disposed outside the valve housing and which mesh with one another and are secured to the shafts of the movable valve members and serving as a coupling between the valve members, which upon adjustment of said first valve member effects a simultaneous adjustment of said second valve member, wherein on the basis of a gear ratio of the coupling, a cross-sectional change at said second valve member differs from the cross-sectional change made at the first valve member, in which at least one valve seat is disposed on a nipple, and said nipple can be screwed into or out of the valve housing in order to adjust the seat position, and at least one of said drive gear wheels is provided with tooth gaps that effect a disengagement of the drive gear wheels secured to the valve shafts.

11. A mixing faucet as defined by claim 10, in which said drive gear wheels of one diameter ratio can be replaced as a set by other sets having other diameter ratios.

12. A mixing faucet as defined by claim 10, in which at least one control motor is provided to drive at least one of the valve members or drive gear wheels for at least one valve member.

* * * * *